Inventor:
JAKOB KÄGI

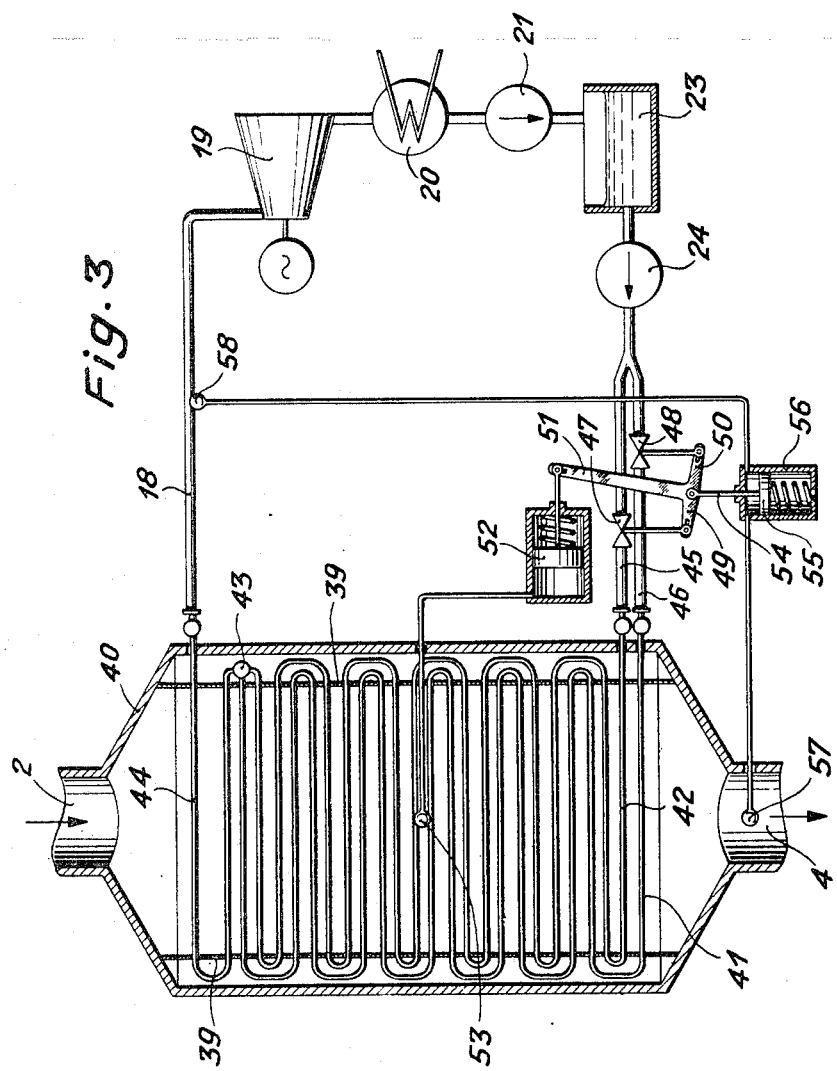

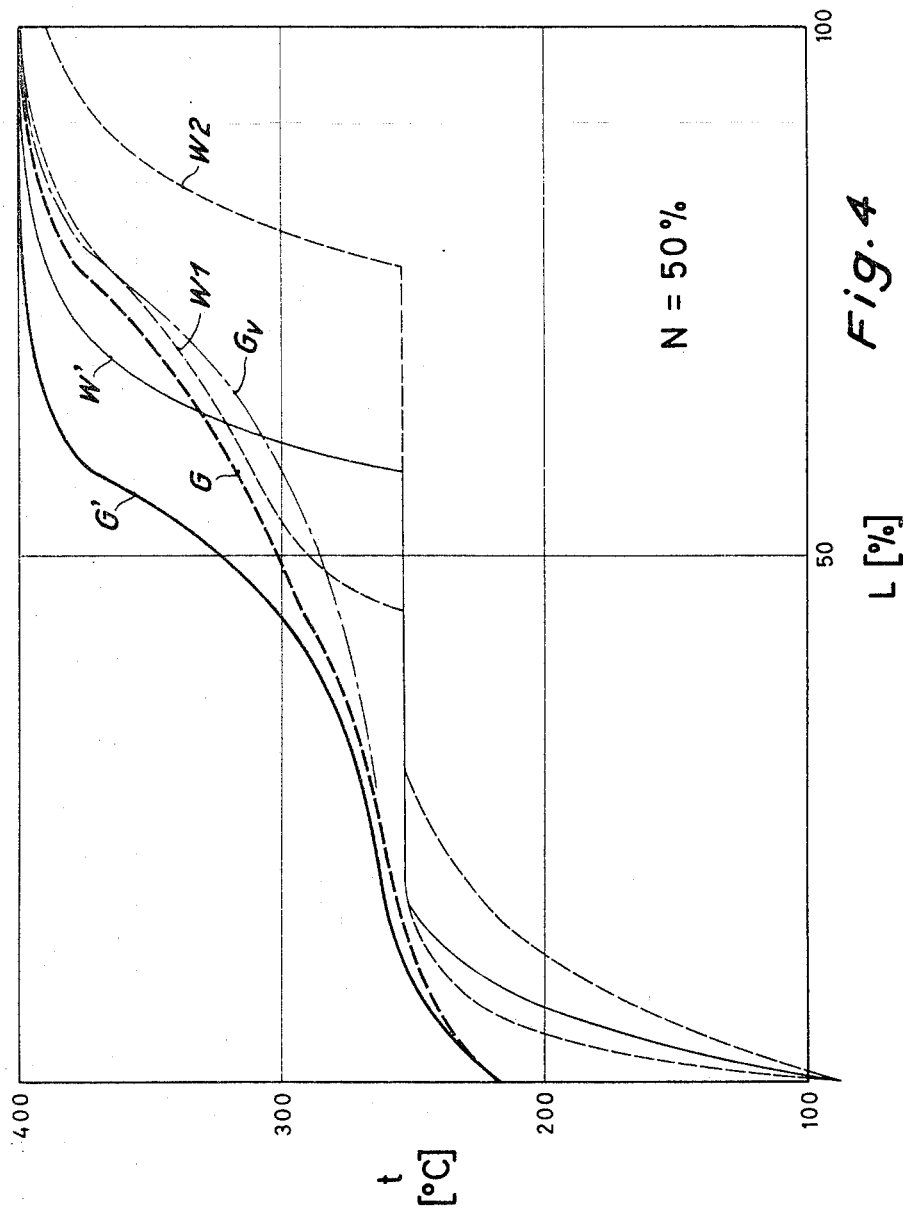

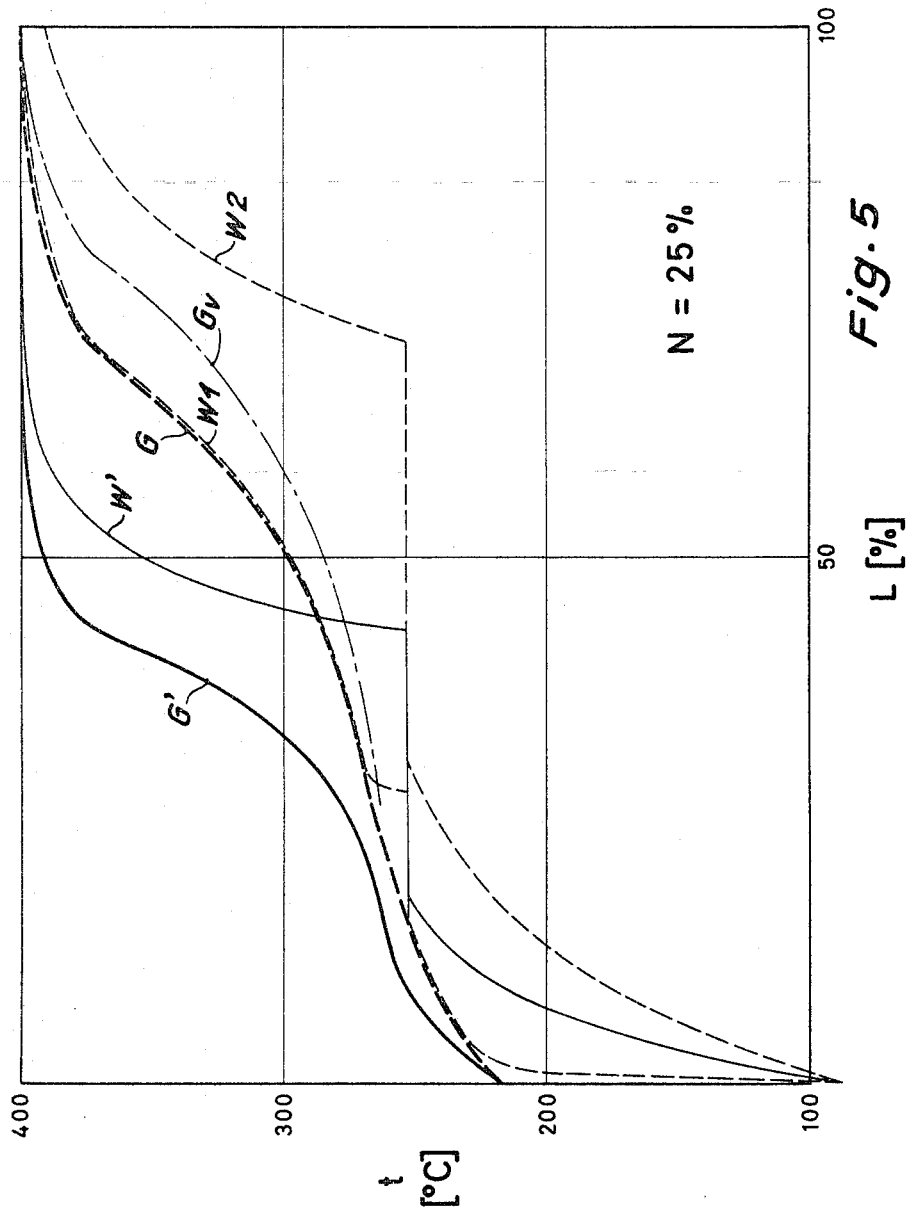

United States Patent Office 3,349,003
Patented Oct. 24, 1967

3,349,003
METHOD OF HEATING WORKING MEDIUM IN THE HEAT EXCHANGER OF A NUCLEAR REACTOR INSTALLATION
Jakob Kägi, Wiesendangen, Zurich, Switzerland, assignor to Sulzer Brothers, Limited, Winterthur, Switzerland, a corporation of Switzerland
Filed Aug. 9, 1965, Ser. No. 478,283
Claims priority, application Switzerland, Aug. 13, 1964, 10,616/64
14 Claims. (Cl. 176—60)

The invention relates to a method of heating a working medium in the heat exchanger of a nuclear reactor installation by means of a heat vehicle circulating through the reactor and the heat exchanger, the working medium being placed in parallel component flows in a heat exchange relationship with the heat vehicle in such a way that it passes from where the cold heat vehicle leaves the heat exchange relationship to where the hot heat vehicle enters the heat exchange relationship, i.e. in the opposite direction to that in which the temperature of the heat vehicle flow drops. The method according to the invention is characterised in that the working medium flow and the heat vehicle flow are so arranged that the working medium in the individual component flows is in a heat exchange relationship with a heat vehicle flow having the same temperature drop, and in that at full load the working medium flow is equal in the individual component flows whereas at partial load the working medium flow is so adjusted that at least one component flow is reduced faster than another, that the temperature drop in the heat vehicle flow shifts towards its entry into the heat exchange relationship, as compared with the temperature curve for uniform reduction of all component flows.

The nuclear reactor installation for carrying out the method, having a heat exchanger with pipe strings which are arranged in parallel in the flow of the heat-absorbing working medium and are in counter-current relationship with the flow of heat vehicle giving off heat, is characterised in that corresponding parts of the pipe strings are arranged at places having equal temperature in the flow of the same heat vehicle, and in that a distributing device for the working medium is adapated to distribute the working medium flow evenly over the individual pipe strings of the heat exchanger at full load, whereas at partial load the working medium flow in at least one pipe string is reduced faster than in another pipe string.

It is well known that in nuclear reactor installations heat can be removed from the reactor by a circulating heat vehicle, e.g. a gaseous heat vehicle, and transferred in one or more heat exchangers to a working medium which is pre-heated, evaporated and superheated in the heat exchanger. The superheated working medium is then expanded in a turbine plant and does work. For reasons of thermodynamics the heat exchanger generally contains a countercurrent arrangement. As a result the evaporation end point of the working medium shifts, depending on the output of the heat exchanger at the time. This has the considerable drawback that the part of the heat exchanger which has to adapt to the maximum temperatures of the working medium and the heat vehicle is not limited to the end near the working medium outlet, but covers a much larger portion, possibly extending past the middle of the heating surface of the heat exchanger. This involves considerable expenditure on heat-resistant material and processing, particularly in nuclear reactor installations operating at high temperatures and high pressures. This also occurs in plants in which the working medium pressure is supercritical, even when there is no real evaporation. At partial load, in a heat exchanger designed for larger quantities of medium, the working medium is brought to the final temperature soon after entering the pipe strings and so is at this temperature for the rest of its passage through the heat exchanger. The object of the invention is to make the temperature distribution in the heat exchanger such that at any load the maximum temperatures for the working medium and heat vehicle are restricted to a small part of the heat exchanger, both at partial load and at full load.

The invention will now be described with reference to the accompanying drawings showing diagrams and schematic representations of embodiments. In the drawings:

FIG. 1 gives the temperature curves of the working medium and the heat vehicle in a known heat exchanger of the type described, at various loads;

FIG. 3 shows a different form of the regulating device for the heat exchanger in FIG. 2;

FIG. 4 shows the temperature curve for the working medium and the heat vehicle in a heat exchanger constructed according to the invention, at half load; and FIG. 5 shows a curve corresponding to that in FIG. 4 but at quarter load.

Figure 1:
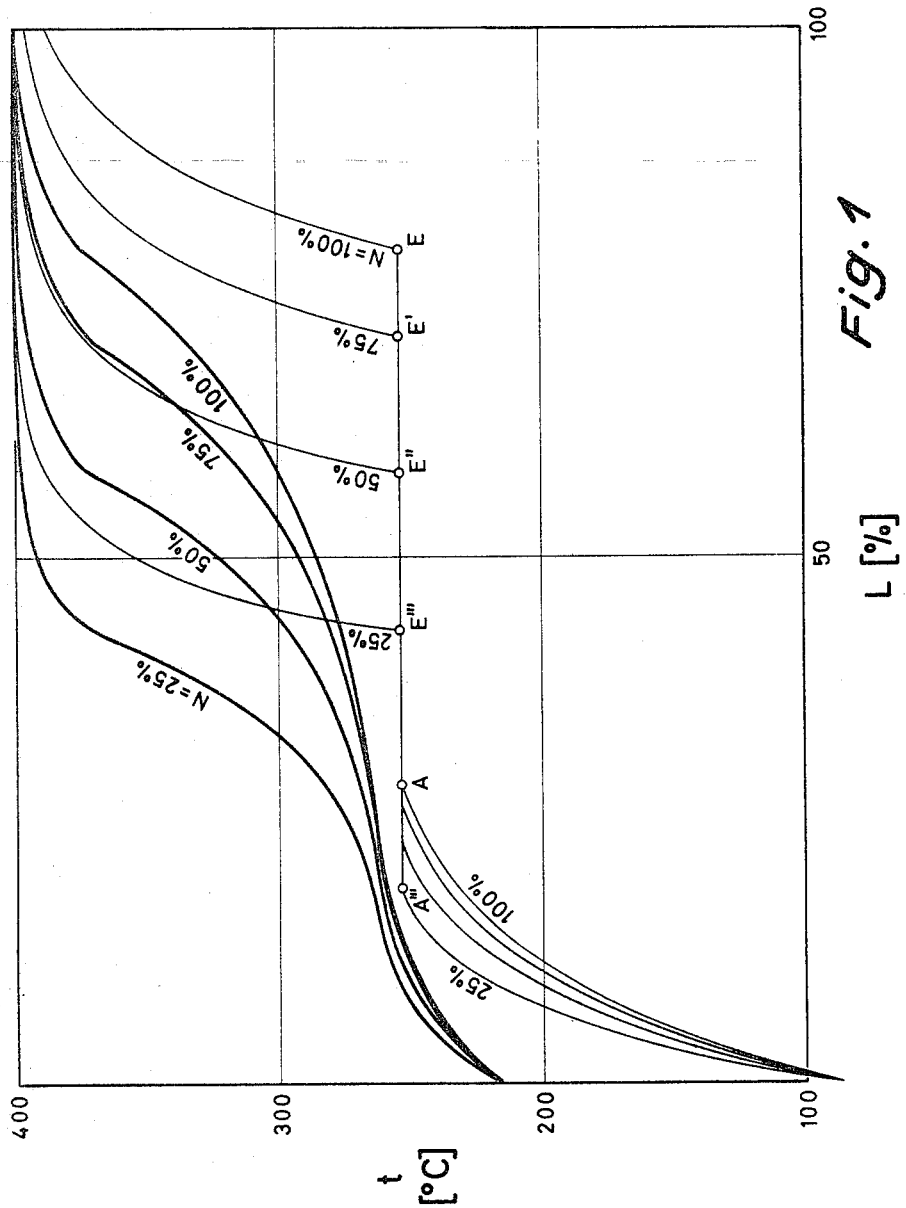

FIG. 1 shows the temperature curves of the heat vehicle and the working medium, which in this case is water or water vapor, along the heat exchange surface (L) at a working medium pressure of about 40 atm. abs. (excess). The heavy curves are those for the heat vehicle, the thin curves those for the working medium. Four curves are plotted for each medium, one each for 25%, 50%, 75% and 100% of the full load. As the diagram shows, the evaporation end point E of the working medium is at approximately 80% of the heat exchange surface at full load. As the load lessens, the evaporation end point shifts towards the beginning of the heat exchange surface (E' and E'' in FIG. 1), and at 25% load it reaches a position (E'''), corresponding to about 40% of the heat exchange surface. The temperature curve for the heat vehicle for $N=25\%$ shows that in the known construction more than half of the heat exchanger must be constructed for practically the maximum temperature. A further disadvantage is the steepness of the temperature curve for the heat vehicle occurring at partial load, which causes great heat stressing in the materials of the pipe coils.

Figure 2:
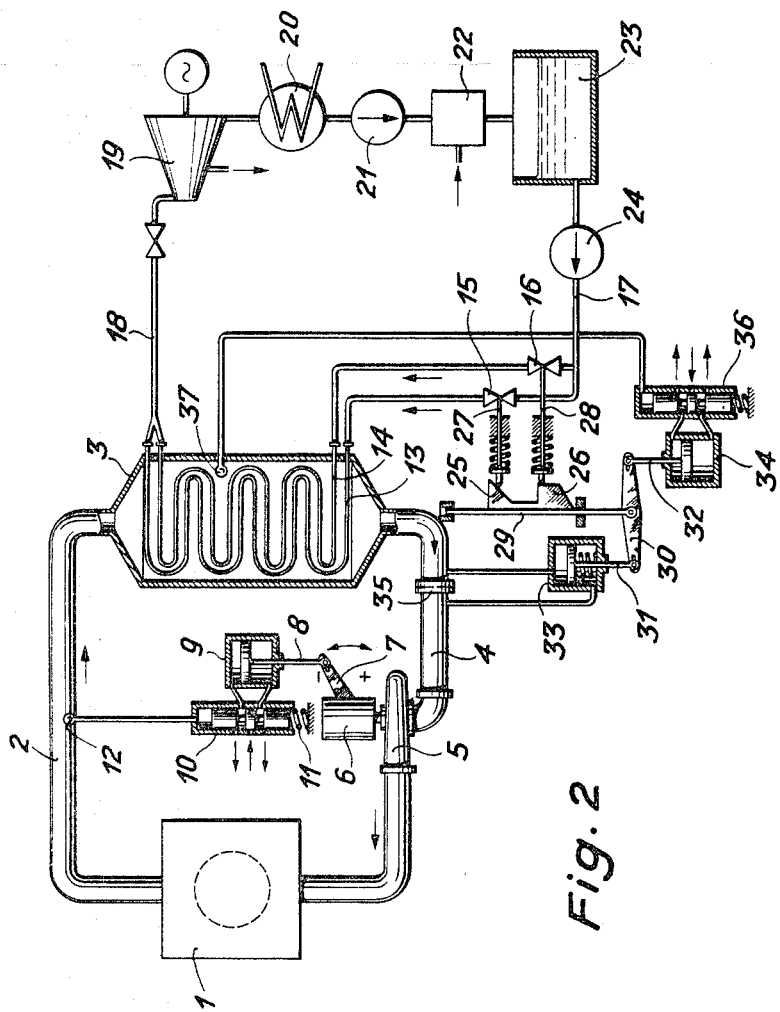
FIG. 2 shows a nuclear reactor installation with a heat exchanger constructed according to the invention.

A nuclear reactor installation for carrying out the method according to the invention is shown in FIG. 2. A heat vehicle, e.g. a gaseous heat vehicle, circulates through a reactor 1, a pipe 2, a heat exchanger 3 and a pipe 4 with circulating means 5. The circulating means is operated by variable-speed drive means, e.g. an electric motor 6. A lever 7 with the signs +, −, indicates the device for changing the speed of the motor 6, which may be of any known type. In the diagrammatic view in FIG. 2, the lever 7 is engaged by a piston rod 8 of a hydraulic servomotor 9, operated by a hydraulic valve 10. The piston of the valve 10 responds to a spring 11 and to hydraulic pressure forming the regulating signal from a temperature senser 12. This senser is arranged in the pipe 2 and determines the temperature of the heat vehicle leaving the reactor.

The heat exchanger 3 contains two pipe coils 13, 14, connected in parallel by way of valves 15, 16 to a feed line 17 for the working medium. The pipe coils are in a countercurrent relationship with the flow of the heat vehicle. They are arranged so that corresponding parts are situated at places having the same temperature in the same flow of the heat vehicle. Corresponding parts in this connection mean parts of the two pipe strings, in which the working medium, flowing at the same rate of feed, has reached the same temperature in both pipe strings. In the arrangement shown, therefore, the pipe strings are in a countercurrent-crosscurrent relationship, the individual windings of the pipe coils being inserted one into the other. This insures that the working medium in both pipe strings is in a heat-exchange relationship with a flow of the heat vehicle having the same temperature drop. As FIG. 2 shows, the inner pipe bends are drawn out as far as the outer pipe bends of the pipe coils. This is so that the heat vehicle flows round both pipe strings to an equal extent, as far as possible. The pipe coils 13, 14 come out into a common steam line 18 leading to a steam turbine 19. From this turbine the working medium goes into a condenser 20, then through a condensed-steam pump 21 and a preheater 22 into a reservoir 23. It is extracted from this reservoir by a feed pump 24 in a liquid state and supplied to the feed line 17.

The two feed valves 15, 16 are operated, according to FIG. 2, by cams 25, 26 cooperating with spring-loaded valve rods 27, 28 belonging to the valves 15, 16. If the valve rod moves to the right in the drawing it opens the valve; if it moves to the left it closes it. The cams 25, 26 are attached to a vertically movable rod 29 engaging a two-armed lever 30 whose ends are connected to the piston rods 31, 32 of servomotors 33, 34. The servomotor 33 is operated in dependence on the pressure difference at an orifice 35 in the pipe 4. The servomotor 34 is operated by way of a valve 36 corresponding to the valve 10, in dependence on the actual value delivered by a temperature senser 37 in the heat exchanger.

During operation of the nuclear reactor installation shown in FIG. 2, the rate at which the heat vehicle circulates in the primary circuit depends on the temperature detected by the temperature senser 12. If the heat output of the reactor rises, the rate of circulation of the heat vehicle is increased so that the temperature detected by the temperature senser 12 remains approximately constant. If the heat output drops the rate of circulation drops accordingly. At the orifice 35 there is therefore a pressure drop corresponding to the heat output of the reactor. The lever 30 is moved by the servomotor 33 in dependence on the heat output of the reactor, causing axial displacement of the rod 29 with the cams 25, 26. If the pressure difference at the orifice 35 rises as a result of an increase in the reactor heat output, the rod 29 with the cams 25, 26 moves downwards in the figure. The shape of the cams is such that in the first part of a downward movement corresponding to a rise in output the valve 16 is fully opened by the cam 26 before the valve 15 begins to open. Conversely, when the rod 29 moves upwards from its lower limit position corresponding to full load operation, the valve 15 is throttled first, and only when this valve has been completely throttled does throttling of the valve 16 begin. Preferably, the valve 15 is not completely closed even in the fully throttled position, to allow passage of a certain small amount of working medium, e.g. 1–5% of the amount fed to the string at full load.

The right-hand end of the lever 30 in FIG. 2 could be fixed, and the parts 34, 36, 37 could be omitted. However, these parts provide useful automatic control according to the temperature within the heat exchanger. If, for the same pressure difference at the orifice 35, the temperature at the senser 37 is greater than the value set at the valve 36, i.e. if the pressure downward onto the piston of the valve from the signal line is greater than the force exerted upwards by the spring in the middle position, the rod 29 is moved downwards by the servomotor 34. This also has the effect of increasing the rate of feed in the manner described above. Conversely, the rate of feed is reduced by lowering the rod 29 when the temperature at the senser 37 is too low.

The operation of the heat exchanger and regulating device according to the invention will now be described with reference to FIGS. 4 and 5. In these figures the broken line G is the temperature curve for the gaseous heat vehicle, and the curves W1, W2 are the temperature curves for the working medium in the two pipe strings in the heat exchanger, plotted against the heat exchange surface. The corresponding curves G' and W' for a heat exchanger with the known, uniform distribution of the working medium are given for comparison. Both diagrams also give, with a broken line, the temperature curve $G_v$ for the heat vehicle at full load. The diagram in FIG. 4 is for half load, and of the total quantity of working medium 96% flows through one of the parallel strings shown in FIG. 2 and 4% through the other string. FIG. 5 shows the corresponding curves for quarter load. FIGS. 4 and 5 show that in the heat exchanger constructed according to the invention, in contrast with the known construction, the high temperatures are restricted to one part comprising little more than 25% of the heat exchange surface; moreover, the high temperatures are displaced only slightly compared with the state at full load.

FIG. 3 shows an embodiment of the invention in which the distribution of the working medium over the individual strings is not exactly predetermined, as happens in the first embodiment on account of the cams 25, 26, but is effected on the basis of a temperature measurement in the heat exchanger. In this figure, a heat exchanger 40 is arranged in the flow of heat vehicle in the same way as the heat exchanger 3 in FIG. 2, and is connected to the pipes 2, 4. It has pipe coils 41, 42 leading into a collector 43 inside the heat exchanger. To prevent uneven heating of the bends of the pipe strings by the heat vehicle, the heat exchanger is provided with partitions 39 preventing the heat vehicle from flowing round the bends. This also ensures that the heat vehicle flows round both pipe coils equally, which is provided in the first embodiment by the special form of the pipe bends. A common pipe coil 44 leads from the collector 43 into the steam line 18 and on to the turbine 19. The pipe coils 41, 42 communicate with a feed line branches 45, 46 containing valves 47, 48. These valves are operated by arms 49, 50 belonging to a three-armed lever, of which the third arm 51 is affected by a servomotor 52 connected to a temperature senser 53. The fulcrum of the three-armed lever is attached to a piston rod 54 belonging to a spring-loaded piston 55 of a servomotor 56. Signals from two temperature sensers 57, 58 act on the piston 55 in the form of hydraulic pressure. The senser 57 measures the temperature of the heat vehicle flowing out of the heat exchanger, and the senser 58 measures the temperature of the steam in the pipe 18.

Under the influence of the temperature sensers 57, 58 the three-armed lever is raised or lowered in the figure, causing the valves 47, 48 to operate in the same direction. In response to the senser 53 the arm 51 of the three-armed lever moves and the lever turns about its fulcrum on the piston rod 54. This causes the valves 47, 48 to operate in opposite directions, and gives an arrangement such that when the temperature rises at the senser 53, the distribution of the working medium between the two strings becomes more uneven, and vice versa.

Obviously, it would be possible and advantageous to construct heat exchangers with more than two parallel strings which could be regulated in the manner described as regards the supply of working medium.

With a larger number of pipe strings, it would be possible to combine the pipe strings into at least two groups, supplying the individual groups in the manner described. The working medium could then be distributed evenly over the pipe strings in each group.

While the diagrams given in FIGS. 1, 4, 5 relate to a working medium, e.g. water, which is evaporated and superheated in the temperature and pressure range prevailing in the heat exchanger, this is not an essential feature of the invention. The invention may also be applied to working media which are not evaporated. For example, when water is used the pressure may be supercritical. The effect of the construction according to the invention remains the same; at partial load the high temperatures are restricted to a small portion of the heat exchanger and they are prevented from shifting towards the inlet end of the working medium.

What is claimed is:

1. A method of heating a working medium in the heat exchanger of a nuclear reactor installation comprising the steps of
   (1) circulating a heat vehicle through the reactor and the heat exchanger at a variable rate of flow,
   (2) circulating a working medium at variable flow rates in a plurality of parallel component flows in heat exchange relationship with the heat vehicle in a flow direction opposite to the flow direction of the heat vehicle in the exchanger, and
   (3) distributing the working medium between the parallel component flows at variable rates in response to the rate of flow of the heat vehicle to the nuclear reactor to have each parallel component flow in a heat exchange relationship with the heat vehicle of the same temperature drop whereby the temperature drop in the heat vehicle flow shifts toward the entry thereof into the heat exchanger upon reduction of flow rate of the working medium as compared to the temperature curve for a uniform reduction of all the component flows.

2. A method as set forth in claim 1 wherein said distributing step includes reducing the working medium flow to a minimum value in one component flow before reducing the working medium flow below a full load value in another component flow in response to a progressive load reduction.

3. A method as set forth in claim 1 wherein said distributing step includes increasing the working medium flow from a minimum value to the full load value in one component flow before increasing the working medium flow above the minimum value in another component flow in response to a progressive load increase.

4. A method as set forth in claim 1 wherein the step of distributing the working medium flow to the parallel component flows is further responsive to a temperature measured in the heat exchanger whereby the difference in flow distribution increases with a temperature increase and vice versa.

5. A method as set forth in claim 1 which further includes the steps of preheating, evaporating and superheating the working medium in the heat exchanger in response to the transfer of heat from the heat vehicle.

6. In a nuclear reactor installation
   a heat exchanger,
   means for circulating a heat vehicle through said heat exchanger in a first flow direction,
   a plurality of pipe strings contained in said heat exchanger, said pipe strings being arranged in parallel relationship with respect to each other,
   means for circulating a heat absorbing working medium through said plurality of pipe strings in a second flow direction opposite to said first flow direction, and
   means for distributing the working medium to said pipe strings at variable rates of flow to restrict the maximum temperature of said heat vehicle and said working medium to a small part of said heat exchanger, said distributing means including a distributing device for varying the rate of flow of working medium in one of said pipe strings in advance of varying the rate of flow of working medium in another of said pipe strings.

7. A nuclear reactor installation as set forth in claim 6 wherein said distributing means further includes a plurality of feed valves, each of said valves being interconnected to a respective one of said plurality of pipe strings for varying the rate of working medium flow therethrough and being responsive to said distributing device.

8. A nuclear reactor installation as set forth in claim 6 wherein said distributing device includes a pair of cams, each of said cams being operatively connected to a respective one of said pipe strings.

9. A nuclear reactor installation as set forth in claim 6 wherein said distributing means further includes means responsive to the heat vehicle flow rate from said heat exchanger for actuating said distributing device whereby upon an increase in heat vehicle flow the rate of working medium flow in one of said pipe strings is increased to a predetermined load value before the rate of working medium flow in another of said pipe strings is increased and vice versa upon a decrease in heat vehicle flow.

10. A nuclear reactor installation as set forth in claim 6, characterised in that the pipe strings are combined into at least two groups, and the working medium is distributed uniformly over the pipes within each group, whereas the distribution of the working medium over the individual groups is regulated by the distributing device.

11. A nuclear reactor installation, as set forth in claim 6, characterised in that the pipe strings are in a counter-current-crosscurrent arrangement in the heat exchanger and the individual windings of the pipe coils are inserted one into the other.

12. A nuclear reactor installation as set forth in claim 6, characterised in that the heat exchanger is a forced-flow once-through vapor generator.

13. A nuclear reactor installation as set forth in claim 9 wherein said distributing means further includes means responsive to the temperature in said heat exchanger for actuating said distributing device whereby upon an increase in temperature in said heat exchanger the rate of working medium flow in one of said pipe strings is increased to a predetermined load value before the rate of working medium flow in another of said pipe strings is increased and vice versa upon a decrease in temperature.

14. A nuclear reactor installation comprising
   a heat exchanger,
   means for circulating a heat vehicle through said heat exchanger in a first flow direction,
   a plurality of pipe strings contained in said heat exchanger, said pipe strings being arranged in parallel relationship with respect to each other,
   means for circulating a heat absorbing working medium through said plurality of pipe strings in a second flow direction opposite to said first flow direction,
   means responsive to the heat output of the nuclear reactor for adjusting the total quantity of working medium fed to said plurality of pipe strings, and
   means responsive to the temperature in said heat exchanger for distributing the quantity of fed working medium between said plurality of pipe strings.

References Cited

UNITED STATES PATENTS

| 3,124,109 | 3/1964 | Von Benten | 122—406 |
| 3,127,877 | 4/1964 | Profos | 122—406 |
| 3,144,856 | 8/1964 | Brunner | 122—406 |
| 3,253,994 | 5/1966 | Kagi | 176—20 |

REUBEN EPSTEIN, *Primary Examiner.*